United States Patent
McKay et al.

(10) Patent No.: US 10,462,092 B2
(45) Date of Patent: Oct. 29, 2019

(54) AUTHENTICATING NOTIFICATIONS ON ONLINE SOCIAL NETWORKS

(71) Applicant: Facebook, Inc., Menlo Park, CA (US)

(72) Inventors: Jonathan Bryan McKay, Menlo Park, CA (US); Wai Davidgeolim Lim, Hong Kong (HK); Oeyvind Sean Neverdal Kinsey, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 191 days.

(21) Appl. No.: 14/868,123

(22) Filed: Sep. 28, 2015

(65) Prior Publication Data

US 2017/0093784 A1 Mar. 30, 2017

(51) Int. Cl.
*H04L 12/58* (2006.01)
*H04L 29/08* (2006.01)
*G06Q 50/00* (2012.01)
*H04L 29/06* (2006.01)

(52) U.S. Cl.
CPC ............ *H04L 51/32* (2013.01); *G06Q 50/01* (2013.01); *H04L 63/0807* (2013.01); *H04L 63/1466* (2013.01); *H04L 67/02* (2013.01); *H04L 67/146* (2013.01); *H04L 67/26* (2013.01); *H04L 67/306* (2013.01)

(58) Field of Classification Search
CPC ..................................................... H04L 67/02
USPC ....................................................... 709/206
See application file for complete search history.

(56) References Cited

U.S. PATENT DOCUMENTS

| | | | |
|---|---|---|---|
| 2010/0150139 A1* | 6/2010 | Lawson | H04L 12/66 370/352 |
| 2010/0223471 A1* | 9/2010 | Fresko | H04L 63/08 713/176 |
| 2012/0040699 A1* | 2/2012 | Bell | H04L 12/1859 455/466 |
| 2014/0282972 A1* | 9/2014 | Fan | H04L 63/0807 726/7 |
| 2016/0150370 A1* | 5/2016 | Gillespie | H04W 4/029 455/456.3 |

* cited by examiner

*Primary Examiner* — Sm A Rahman
*Assistant Examiner* — Emad Siddiqi
(74) *Attorney, Agent, or Firm* — Baker Botts L.L.P.

(57) ABSTRACT

In one embodiment, a method includes providing an application programming interface (API) to an application running on a client system. The API is provided based on a user of the client system being logged in to a social-networking system on the application. A first request is received from the application, and the first request includes a new messaging token and a request to register the new messaging token to a user profile of the user on the social-networking system. A verification token is sent to the application. A second request is received from the application, and the second request includes the verification token and context information of the application. The second request is sent by the application using the API. In response to the received requests, a registration of the user profile is updated by discarding a previously-registered messaging token and registering the new messaging token to the user profile.

18 Claims, 9 Drawing Sheets

AUTHENTICATING NOTIFICATIONS ON ONLINE SOCIAL NETWORKS

TECHNICAL FIELD

This disclosure generally relates to an improved method of providing notifications on online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

Particular embodiments provide operating-system-level features (e.g., push notifications) via a web browser or other application running on a client system. A server of a social-networking system registers a messaging token associated with a message-distribution server with a user profile of the user of the client device in order to establish a pairing between the user profile and the client system. The social-networking system may generate and send a push notification (i.e., a push notification associated with the user profile) and the registered messaging token to a message-distribution server. The messaging token may identify, to the message-distribution server, the appropriate recipient client system and web browser running on the client system for delivery of the push notification. The message-distribution server may direct the push notification to the identified client system, which may "wake up" the identified web browser. The web browser may provide the push notification for display at an interface of the client system.

Particular embodiments protect against cross-site request forgery (CSRF) by providing an extra authentication handshake between the web browser and the social-networking system (i.e., in addition to the messaging-token registration). This extra authentication handshake may be triggered, as an example and not by way of limitation, when a user updates the version of a web browser installed on his client system. The updated web browser version on the client system may require a new messaging token from the message-distribution server. The browser may send a first registration request to the social-networking system in order to update the registration of the user's user profile. Before the social-networking system registers the new messaging token, it may send a verification token to the web browser. The web browser may send a second registration request to the social-networking system that includes context information (e.g., the user is logged in to the social-networking system via the web browser on the client system). Upon receipt of the second registration request, complete with the context information, the social-networking system may register the new messaging token to the user profile. The social-networking system may then send push notifications to the web browser via the message-distribution server.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed includes not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
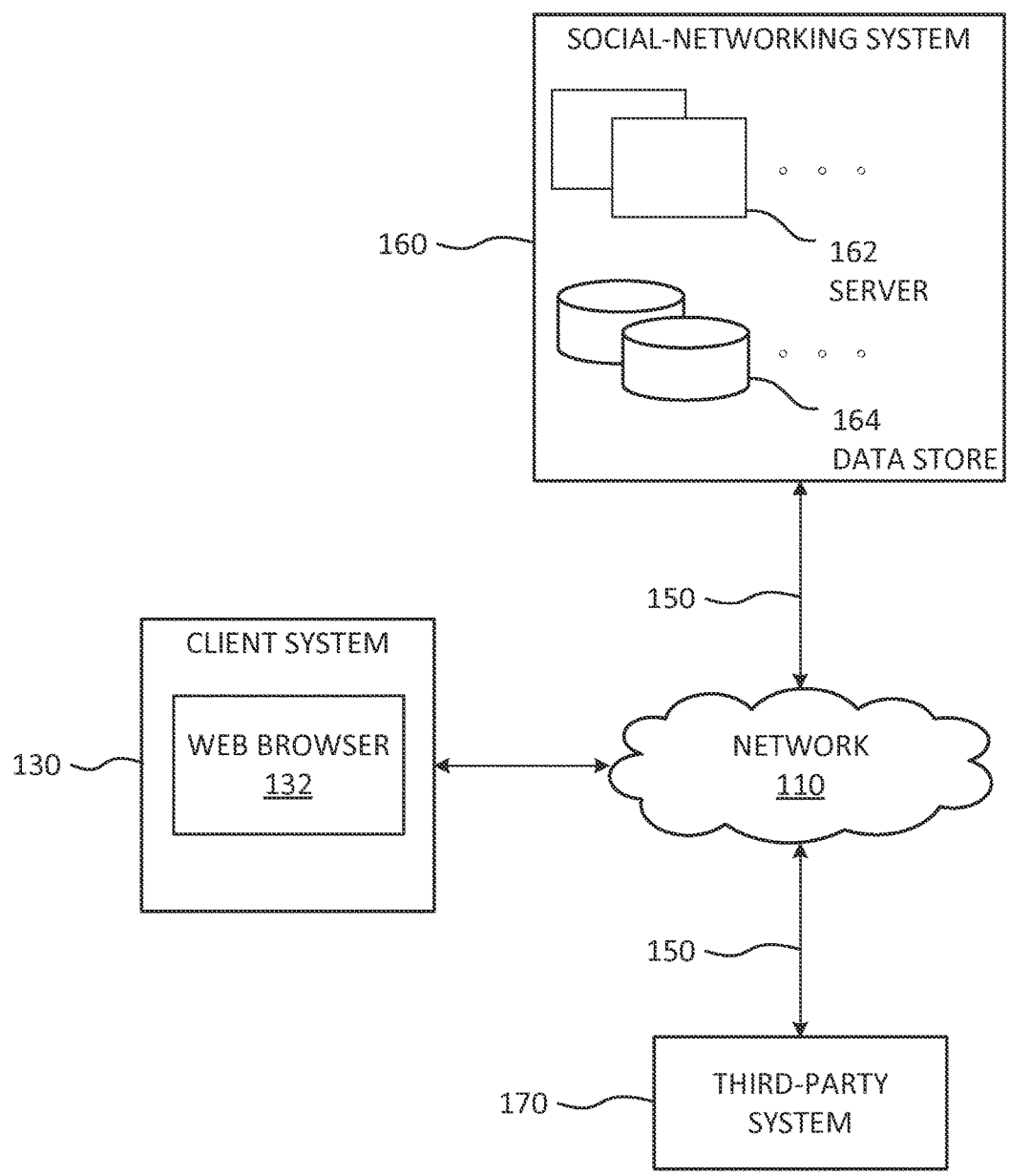
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Browser Notifications

Particular embodiments facilitate the provision of operating-system-level features (e.g., native social-networking application features) via an application (e.g., web browser 132) running on client system 130. When a user accesses social-networking system 160 via web browser 132 (e.g., by logging into a mobile website associated with social-networking system 160), web browser 132 may not have the necessary permissions to provide certain native social-networking application features (e.g., providing push notifications or contact importing). In particular embodiments, native social-networking application features may be integrated into web browser 132—or other application—running on client system 130. As an example and not by way of limitation, social-networking system 160 may provide push notifications to web browser 132 running on client system 130 via a message-distribution server, as described below in connection with FIG. 2A.

Figure 2A:
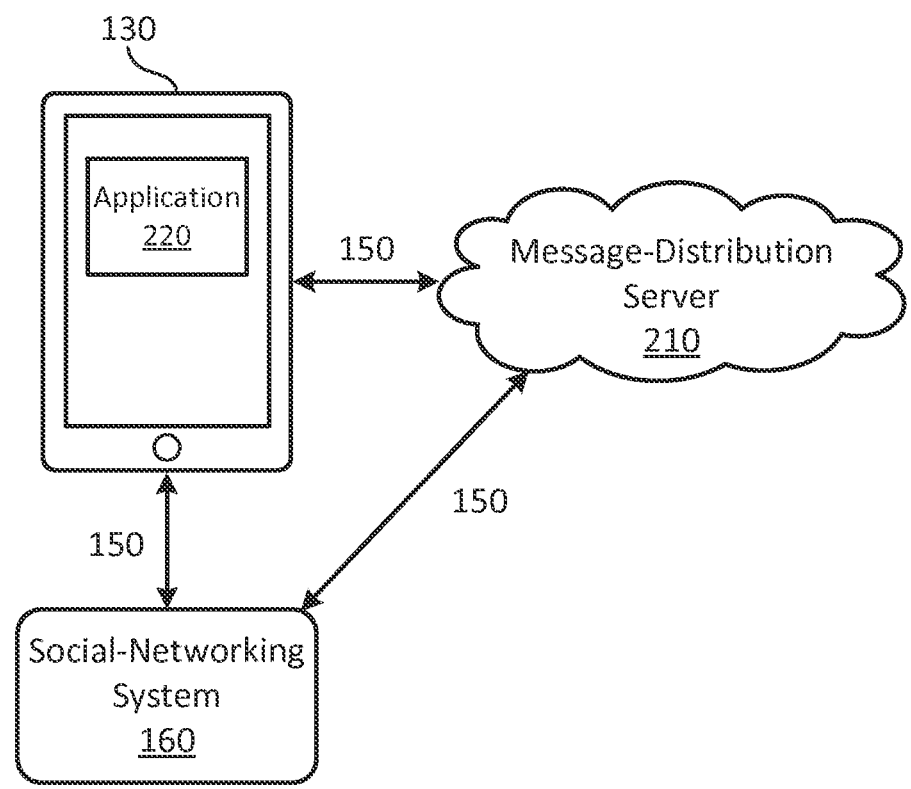
FIG. 2A illustrates an example network environment for providing a notification to a client system.

FIG. 2A illustrates an example network environment 200A for providing a notification to a client system 130. Network environment 200A includes client system 130, social-networking system 160, and message-distribution server 210. Each of client system 130, social-networking system 160, and message-distribution server 210 may be connected to each other, directly or via network 110 (not shown) by links 150. Although FIG. 2A illustrates a particular arrangement of client system 130, social-networking system 160, and message-distribution server 210, this disclosure contemplates any suitable arrangement of client system 130, social-networking system 160, and message-distribution server 210. Application 220 may be any suitable application running on client system 130, including, as an example and not by way of limitation, web browser 132, any other suitable application, or any other suitable third-party application. In particular embodiments web browser 132 may be UC BROWSER or any other suitable web browser.

In particular embodiments, social-networking system 160 may send push notifications to client system 130 by way of message-distribution server 210. Message-distribution server 210 may be any suitable server that facilitates sending and delivery of messages between social-networking system 160 and application 220. As an example and not by way of limitation, message-distribution server 210 may be a server of GOOGLE CLOUD MESSAGING, ALIBABA, any other suitable third-party messaging service, or social-networking system 160. Before client system 130 may receive messages from message-distribution server 210, message-distribution server 210 may require client system 130 to register a messaging token with message-distribution server 210. The messaging token may be, as an example and not by way of limitation, an API key. The messaging token may ensure that messages distributed by message-distribution server 210 are delivered to the intended-recipient client system 130. The messaging token may also ensure that messages are delivered to appropriate application 210 running on client system 130. In particular embodiments, application 220 may send a request for a messaging token to message-distribution server 210 as part of a registration with message-distribution server 210. Message-distribution server 210 may complete the registration by sending a messaging token to client system 130 in response to the received request.

In particular embodiments, social-networking system 160 may require that application 220 register the messaging token that it received from message-distribution server 210 with social-networking system 160 in order to receive push notifications generated by social-networking system 160 and distributed by message-distribution server 210. Application 220 may send a registration request to social-networking system 160. The registration request may be a request to receive push notifications from social-networking system 160 at application 220. Application 220 may send the registration request using an API (not shown) provided by social-networking system 160. The API may be a communication channel between application 220 and social-networking system 160. The registration request may include the messaging token that client system 130 obtained from message-distribution server 210. Social-networking system 160 may register the messaging token to a particular user profile associated with the user of client system 130 by saving the messaging token associated with the user profile. As an example and not by way of limitation, social-networking system 160 may store the messaging token in a node corresponding to a user profile of the user (e.g., in social graph 700) on social-networking system 160. The messaging token may give social-networking system 160 authorized access to the message-distribution services of message-distribution server 210 (if social-networking system 160 is not already authorized to access these services).

In particular embodiments, the registration request may include the messaging token received from message-distribution server 210 and one or more cookies associated with social-networking system 160. As an example and not by way of limitation, application 220 may be web browser 132, and social-networking system 160 may generate the one or more cookies when the user logs in to social-networking system 160 via a website accessed on application 220. Application 220 may store the cookies, which identify the particular user profile or user account logged in at application 220, locally on client system 130. Social-networking system 160 may identify the particular user profile (or user account) associated with the user of client system 130 based on the cookies received in the registration request from application 220. The cookies may indicate that the user associated with the identified user profile is currently logged in to social-networking system 160 on application 220 or has previously logged in to social-networking system 160 on application 220. After receiving the registration request from application 220, social-networking system 160 may complete the registration by associating the messaging token with a particular user profile (or user account) based on the received cookies.

In particular embodiments, social-networking system 160 may generate a push notification to be delivered to application 220. Social-networking system 160 may send the push notification and the messaging token to message-distribution server 210. Because the messaging token identifies client system 130, social-networking system 160 may send the messaging token to message-distribution server 210 with the push notification so that message-distribution server 210 can determine that client system 130 is the proper recipient of the push notification. In particular embodiments, social-networking system 160 may send the messaging token and push notification to message-distribution server 210 as part of a message. As used herein, a "message" may be a container (e.g., a container for data) and may include a header section, a payload section, and any other suitable sections. The payload section may be encrypted. As an example and not by way of limitation, social-networking system 160 may send a push notification to message-distribution server 210 as part of a message, where the push notification is included in an encrypted payload of the message, and where the messaging token is included in a header of the message.

After receiving the message (i.e., push notification and messaging token) from social-networking system 160, message-distribution server 210 may send the push notification to client 130 (i.e., using the messaging token to identify client system 130 and application 220 to which the push notification should be sent). In particular embodiments, message-distribution server 210 may send the push notification to more than one client system of the user (e.g., a smartphone and a tablet computer), based on the more than one client systems being registered with message-distribution server 210 and associated with the user. In particular embodiments, the push notification may be sent to more than one application running on the client system. As an example and not by way of limitation, social-networking system 160 may send the push notification from social-networking system 160 to application 210 as described above via message-distribution server 210 and, additionally, to a native social-networking application running on client system 130. Social-networking system 160 may determine where to send push notifications (e.g., to which client system and to which application) and how many to send based on user-specified permissions (e.g., privacy settings).

In particular embodiments, social-networking system 160 may generate the push notification such that it includes instructions that cause application 220 to perform a final check to make sure that application 220 has the necessary permissions before displaying the push notification to the user. As an example and not by way of limitation, the final check may require that the user is actively logged in to social-networking system 160 in order for the push notification to be displayed. In the example, if social-networking system 160 has already sent the push notification and the messaging token to message-distribution server 210, and then the user logs off social-networking system 160, the final check may prevent the push notification from being displayed on client system 130, as application 220 no longer has permission to display it.

In particular embodiments, client-side rendering of the push notification may be handled by application 220. Once client system 130 receives the push notification from message-distribution server 210, client system 130 may provide the push notification to application 220. Application 220 may render the push notification for display to the user.

Figure 2B:
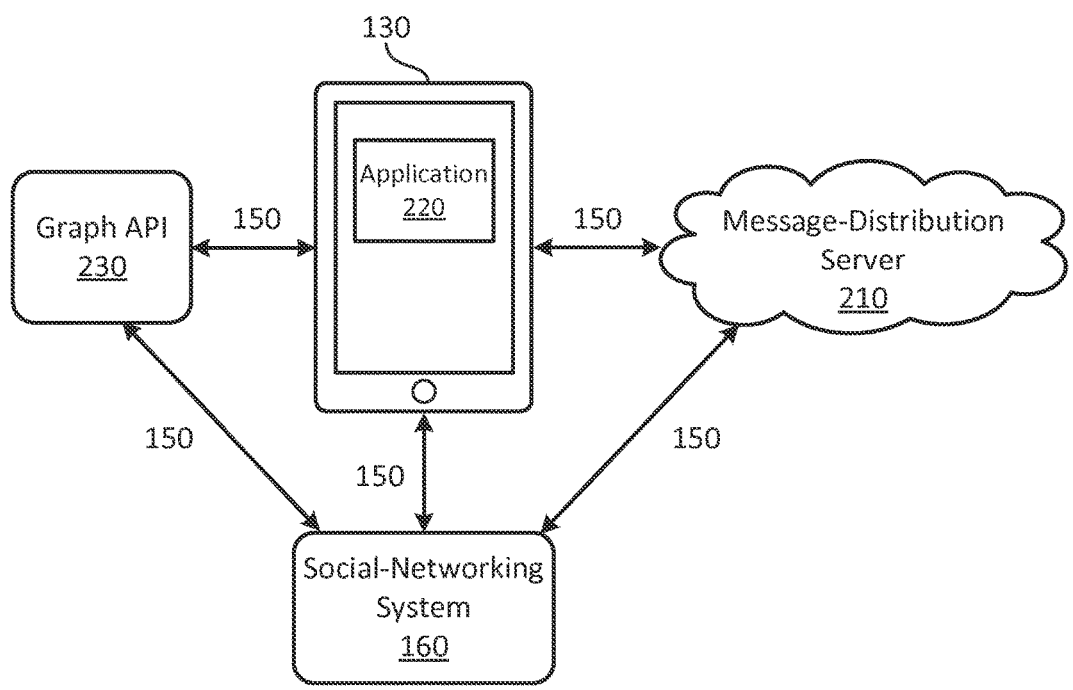
FIG. 2B illustrates an example network environment for providing a notification to a client system.

FIG. 2B illustrates an example network environment 200B for providing a notification to a client system 130. Network environment 200B includes client system 130, social-networking system 160, graph API 230, and message-distribution server 210. Each of client system 130, social-networking system 160, graph API 230, and message-distribution server 210 may be connected to each other, directly or via network 110 (not shown) by links 150. Although FIG. 2B illustrates a particular arrangement of client system 130, social-networking system 160, graph API 230, and message-distribution server 210, this disclosure contemplates any suitable arrangement of client system 130, social-networking system 160, graph API 230, and message-distribution server 210.

In particular embodiments, the push notification may include one or more API calls to graph API 230. As an example and not by way of limitation, when the push notification is received at application 220, an API call may be invoked to retrieve information related to the push notification from social-networking system 160 via graph API 230. The information related to the push notification may be, as an example and not by way of limitation, social-networking information associated with the push notification. Social-networking information may include, as an example and not by way of limitation, information stored in profile of a particular user on social-networking system 160, where the particular user is referenced in the push notification. As discussed in connection with FIG. 3, an API call to graph API 230 may be used to retrieve an image of a user (e.g., a user profile image).

Although this disclosure describes and illustrates particular embodiments of FIGS. 2A-2B as being implemented by social-networking system 160, this disclosure contemplates any suitable embodiments of FIGS. 2A-2B as being implemented by any suitable platform or system. As an example, and not by way of limitation, particular embodiments of FIGS. 2A-2B may be implemented by client system 130. Furthermore, although this disclosure describes and illustrates particular components, devices, or systems carrying out particular steps of the method of FIGS. 2A-2B, this disclosure contemplates any suitable combination of any suitable components, devices, or systems carrying out any suitable steps of the method of FIGS. 2A-2B.

Figure 3:
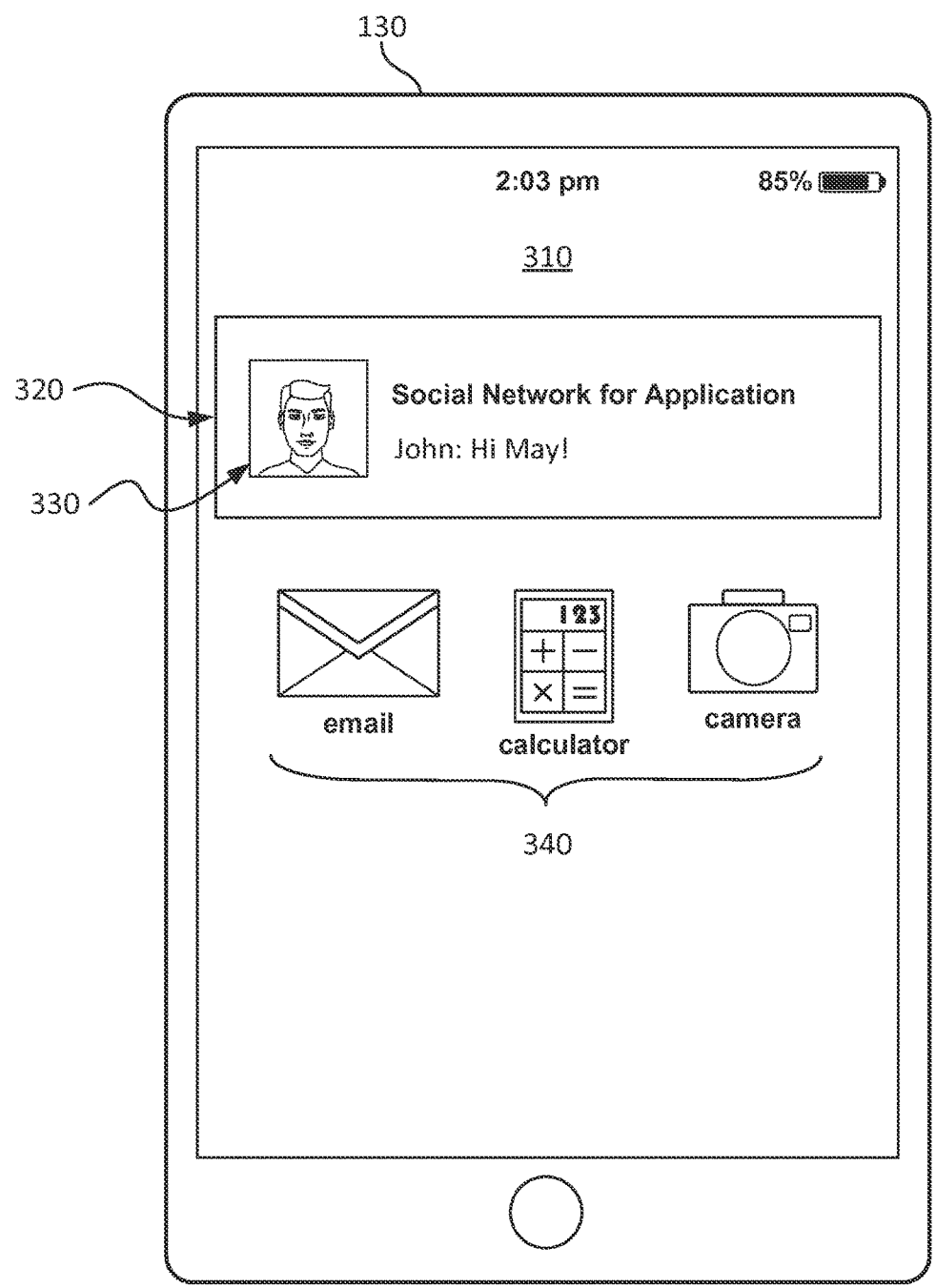
FIG. 3 illustrates an example push notification displayed on an interface of a client system.

FIG. 3 illustrates an example push notification 320 displayed on an interface of a client system 130. In particular embodiments, push notification 320 may be presented on, as an example and not by way of limitation, home screen 310 of client system 130. Push notifications may be displayed to the user on client system 130 in any suitable way, including, as an example and not by way of limitation, on a lock screen of client system 130, on home screen 310 of client system 130, in an interface of application 220 running on client system 130, or in any other suitable interface of client system 130. As an example and not by way of limitation, push notification 330 may be displayed as floating over widgets 340, which may be displayed in home screen 310. In another example and not by way of limitation, push notification 320 may be displayed in a landing view or a drawer view, which may be displayed independent of and without altering the activity of underlying widgets 340 or an underlying application running on client system 130. Once displayed, push notification 320 may persist until selected or dismissed. Any suitable predefined user input received at client system 130 may dismiss push notification 320 (e.g., a touch gesture swiping to the left).

Push notification 320 may be any suitable notification generated by social-networking system 160. As an example and not by way of limitation, push notification 320 may indicate that a message has been received from another user of social-networking system 160. As another example and not by way of limitation, push notification 320 may indicate that one or more other users have performed a social-networking action (e.g., "liked" or commented on) a post published by the user to social-networking system 160. As shown in the example illustrated in FIG. 3, push notification 320 may indicate that a message has been received from another user of the social-networking system 160 (e.g., John). Push notification 320 may include a profile picture 330 of the user from whom the message has been received and some or all of the text of the message (e.g., "Hi May!"). As described above in connection with FIG. 2B, push notification 320 may include one or more API calls, which may be invoked by application 220 to retrieve, for example, profile picture 330 from social-networking system 160 via graph API 230.

In particular embodiments, push notification 320 may include an interactive feature. The interactive feature may include instructions to cause application 220 (e.g., web browser 132) to open a particular web page associated with push notification 320. As an example and not by way of limitation, user selection of push notification 320 at client system 130 may cause web browser 132, which is providing push notification 320 for display, to open a particular web page. In the example illustrated in FIG. 3, user input selecting push notification 320 may cause web browser 132 to open a web page corresponding to a message thread between the user of client system 130 (e.g., May) and the user who sent the message (e.g., John), and the user may be able to view message conversation history and respond to the message via the web page.

Although described notifications are described herein as being push notifications, this is merely illustrative and not by way of limitation. As an example and not by way of limitation, any suitable notifications may be sent by social-networking system 160, via message-distribution server 210, to client system 130, including, as an example and not by way of limitation, push notifications, banner notifications, badge notifications, jewel notifications, messaging notifications, or any combination thereof.

Although this disclosure describes and illustrates particular embodiments of FIG. 3 as being implemented by a web browser 132 running on client system 130, this disclosure contemplates any suitable embodiments of FIG. 3 as being implemented by any suitable platform or system. As an example, and not by way of limitation, particular embodiments of FIG. 3 may be implemented by any suitable application 220 running on client system 130. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Browser-Notification Security

Figure 4:
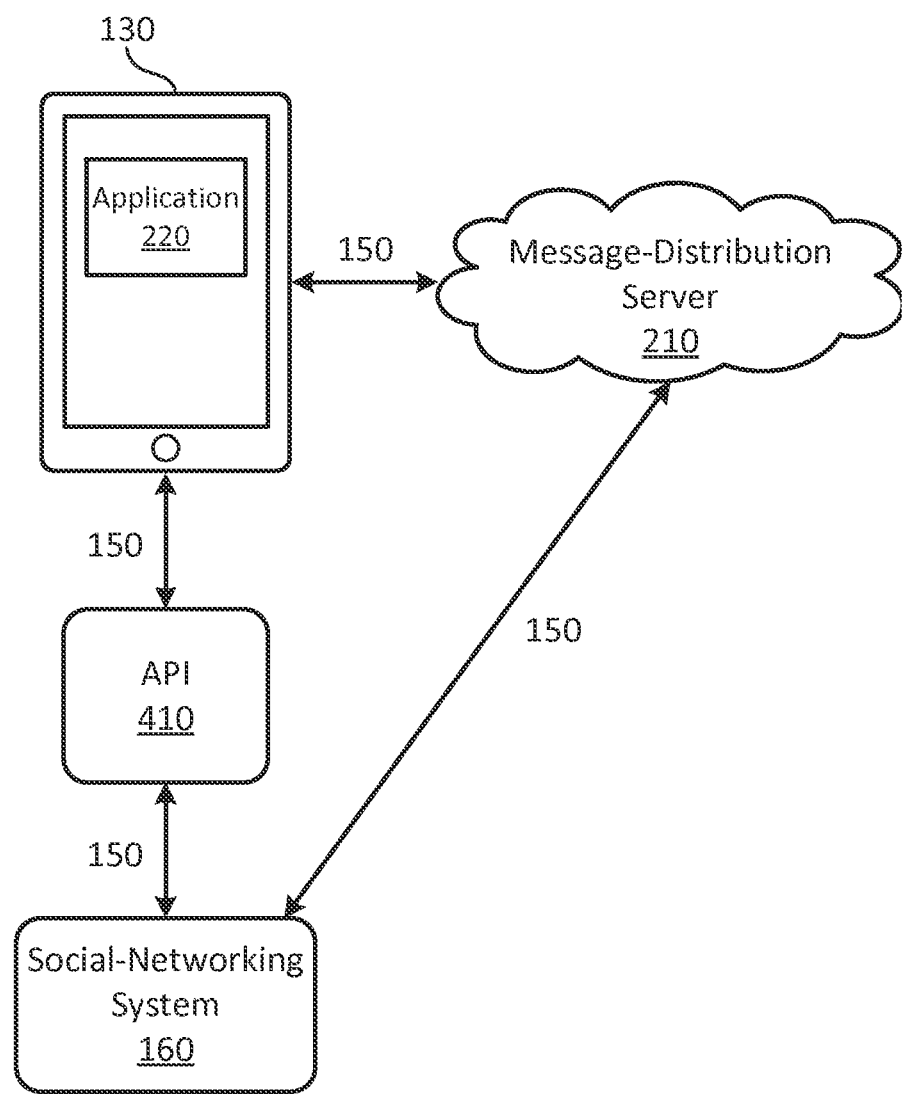
FIG. 4 illustrates an example network environment for authenticating an application on a client system to receive a notification.

FIG. 4 illustrates an example network environment 400 for authenticating an application 220 on a client system 130 to receive a notification (e.g., push notification 320). Network environment 400 includes client system 130, social-networking system 160, API 410, and message-distribution server 210. Each of client system 130, social-networking system 160, API 410, and message-distribution server 210 may be connected to each other, directly or via network 110 (not shown) by links 150. Although FIG. 4 illustrates a particular arrangement of client system 130, social-networking system 160, API 410, and message-distribution server 210, this disclosure contemplates any suitable arrangement of client system 130, social-networking system 160, API 410, and message-distribution server 210.

In particular embodiments, social-networking system 160 may provide API 410 to application 220 running on client system 130. Social-networking system 160 may provide API 410 based on a user of the client system 130 being logged in to a social-networking system 160 on the application 220. As an example and not by way of limitation, social-networking system 160 may provide API 410 in response to a registration request, as described above in connection with FIG. 2A, being received from application 220 (i.e., cookies received as part of registration request may indicate that the user is logged in to social-networking system 160 via application 220). In particular embodiments, the API may be a representational state transfer (REST) API.

In particular embodiments, application 220 may need to register a new messaging token associated with message-distribution server 210 to a user profile of the user of client system 130 (i.e., update the registration of the user profile) on social-networking system 160. In particular embodiments, application 220 may send a registration request including a new messaging token and cookies associated with social-networking system 160 (i.e., a request to register the new messaging token to a user profile of the user) to social-networking system 160. Application 220 may send the registration in response to a trigger event being detected by application 220 using API 410. The trigger event may include, as an example and not by way of limitation, a change in at least one of the cookies associated with social-networking system 160 (i.e., previously-generated cookies), a version of application 220 being updated, the user logging in to social-networking system 160 via application 220, the messaging token having expired (e.g., after a predefined period of time), any other suitable trigger event, or any combination thereof. As another example and not by way of limitation, the trigger event may be the version of application 220 being updated (i.e., a later version than the previously-installed version) and a change being detected at least one of the cookies associated with social-networking system 160 (e.g., the change may be detected by a change listener of application 220).

In particular embodiments, application 220 may send the registration request (i.e., including the new messaging token and cookies associated with social-networking system 160), as described above in connection with FIG. 2A, to social-networking system 160 via an HTTP request (e.g., a GET request). The HTTP request may be, however, susceptible to a CSRF attack. For example, a malicious website seeking to view a user's push notification 320 may spoof the HTTP request (e.g., by sending a registration request including the user's cookies together with the would-be thief's messaging token) in an attempt to register the would-be thief's client system to receive the user's push notification 320 from social-networking system 160 by way of message-distribution server 210. In order to prevent CSRF attacks, before social-networking system 160 registers the new messaging token to the user profile, in response to the received registration request, social-networking system 160 may send a verification token to the browser. The verification token may be, as an example and not by way of limitation, a signed URL.

Application 220 running on client system 130 may receive the verification token sent by social-networking system 160. In particular embodiments, in response to the received verification token, application 220 may send a second registration request to social-networking system 160 using API 410 (i.e., provided by social-networking system 160) in accordance with the appropriate API definition. The second registration request may include context information of application 220. The context information of application 220 may include, as an example and not by way of limitation, an indication that the user is logged in to the social-networking system (e.g., to the appropriate user account) via application 220. A malicious website would not be able to generate and send the second registration request, as the malicious website would not have access to the context information, nor would it be using API 410.

In particular embodiments, social-networking system 160 may determine that the second registration request received from application 220 is complete and correct (i.e., the second registration request includes the verification token and the context information). In response to the received first registration request and the received second registration request, social-networking system 160 may update the registration of the user profile of the user of client system 130. Social-networking system 160 may update the registration of the user profile by discarding the previously-registered messaging token and registering the new messaging token to the user profile. Once the registration is updated, social-networking system 160 may send push notifications to application 220 by way of message-distribution server 210 as described above in connection with FIG. 2A.

Although this disclosure describes and illustrates particular embodiments of FIG. 4 as being implemented by social-networking system 160, this disclosure contemplates any suitable embodiments of FIG. 4 as being implemented by any suitable platform or system. As an example, and not by way of limitation, particular embodiments of FIG. 4 may be implemented by client system 130. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Method Flowcharts

Figure 5:
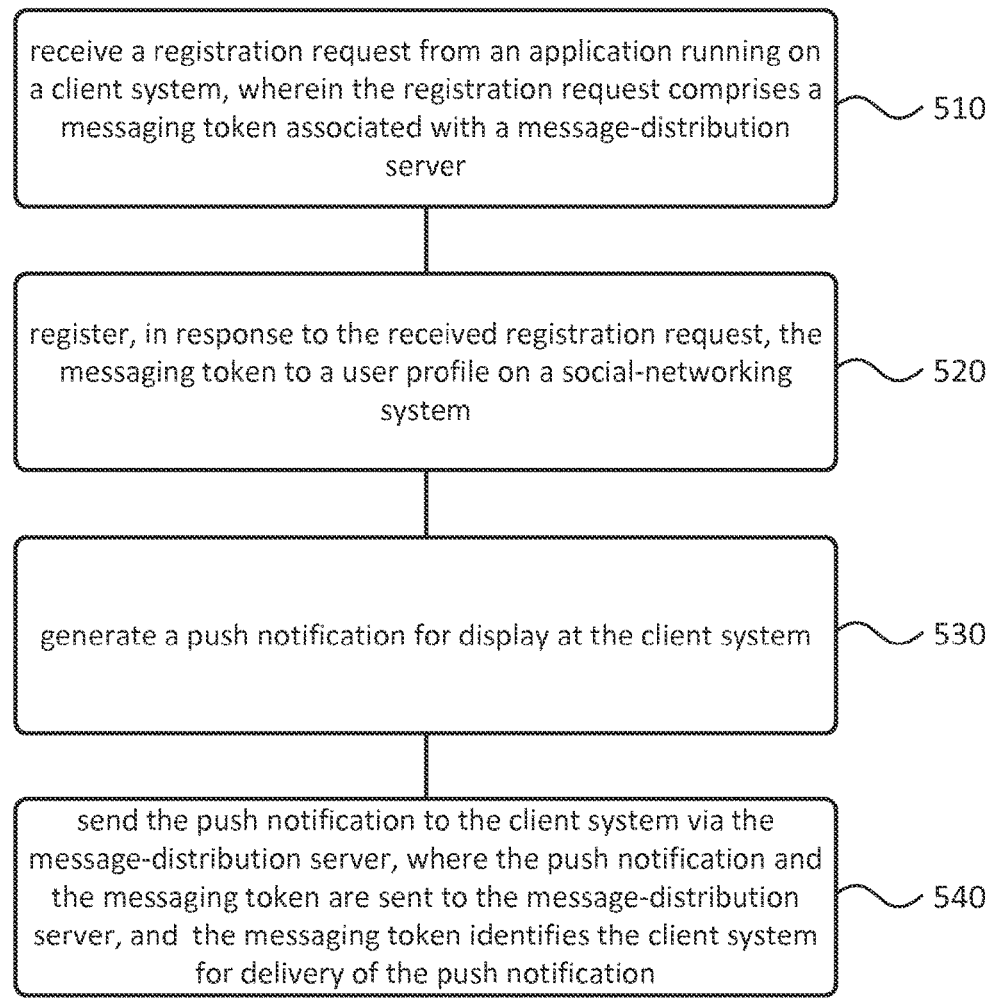
FIG. 5 is a flowchart illustrating an example method for sending a push notification to a client system.

FIG. 5 is a flowchart illustrating an example method 500 for sending a push notification to a client system. The method may begin at step 510, where a registration request is received from an application running on a client system, where the registration request includes a messaging token associated with a message-distribution server. At step 520, in response to the received registration request, the messaging token is registered to a user profile on a social-networking system. At step 530, a push notification is generated for display at the client system. At step 540, the push notification is sent to the client system via the message-distribution server, where the push notification and the messaging token are sent to the message-distribution server, and where the messaging token identifies the client system to the message-distribution server for delivery of the push notification. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing a table, including the particular steps of the method of FIG. 5, this disclosure contemplates any suitable method for providing a table, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
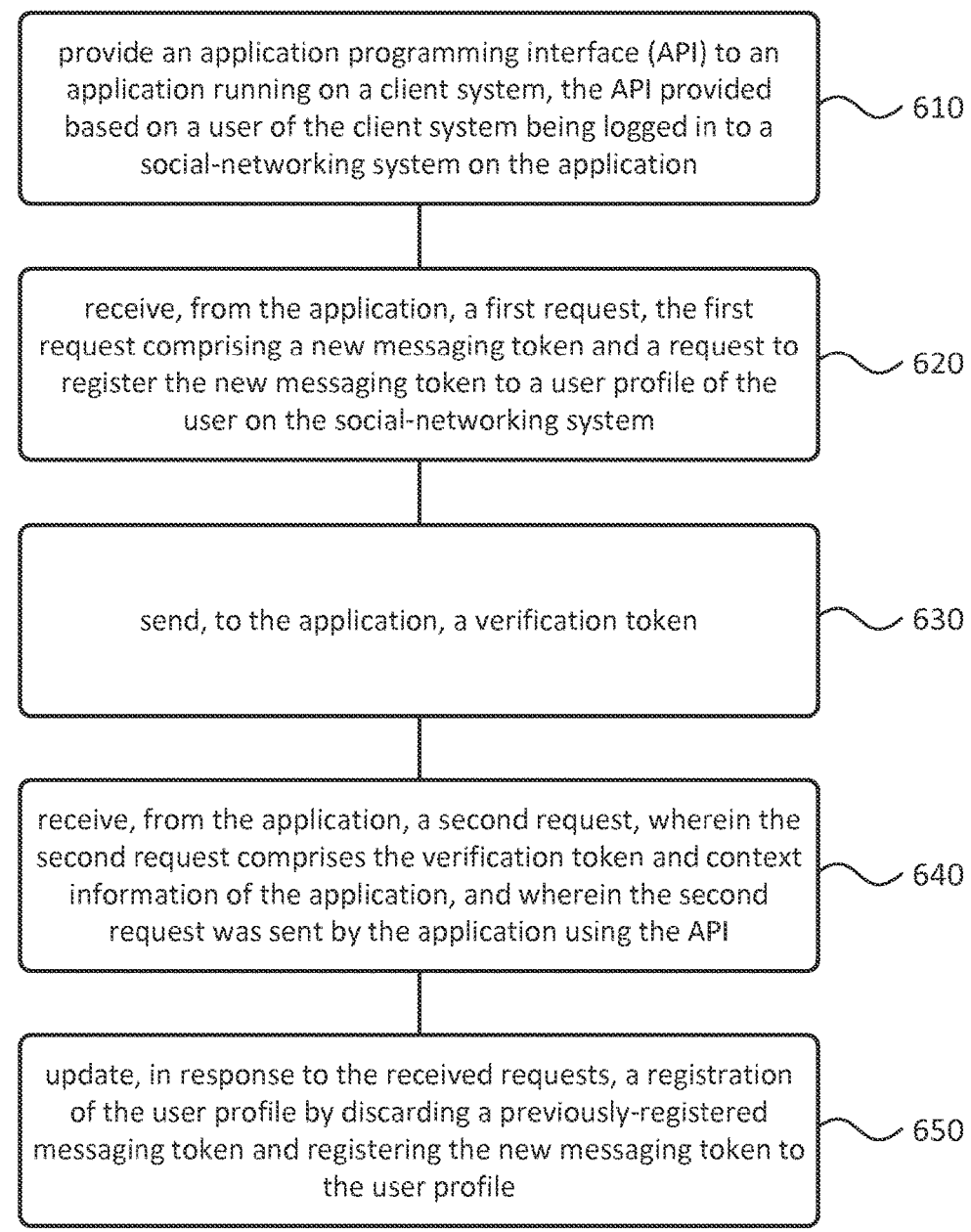
FIG. 6 is a flowchart illustrating an example method for updating a messaging-token registration of a user profile on a social-networking system.

FIG. 6 is a flowchart illustrating an example method 600 for updating a messaging-token registration of a user profile on a social-networking system. The method may begin at step 610, where an API is provided to an application running on a client system, the API being provided based on a user of the client system being logged in to a social-networking system on the application. At step 620 a first request is received from the application, where the first request includes a new messaging token and a request to register the new messaging token to a user profile of the user on the social-networking system. At step 630, a verification token is sent to the application. At step 640, a second request is received from the application, where the second request comprises the verification token and context information of the application, and where the second request was sent by the application using the API. At step 650, in response to the received first request and the received second request, a registration of a user profile is updated by discarding a previously-registered messaging token and registering the new messaging token to the user profile. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing a table, including the particular steps of the method of FIG. 6, this disclosure contemplates any suitable method for providing a table, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graphs

Figure 7:
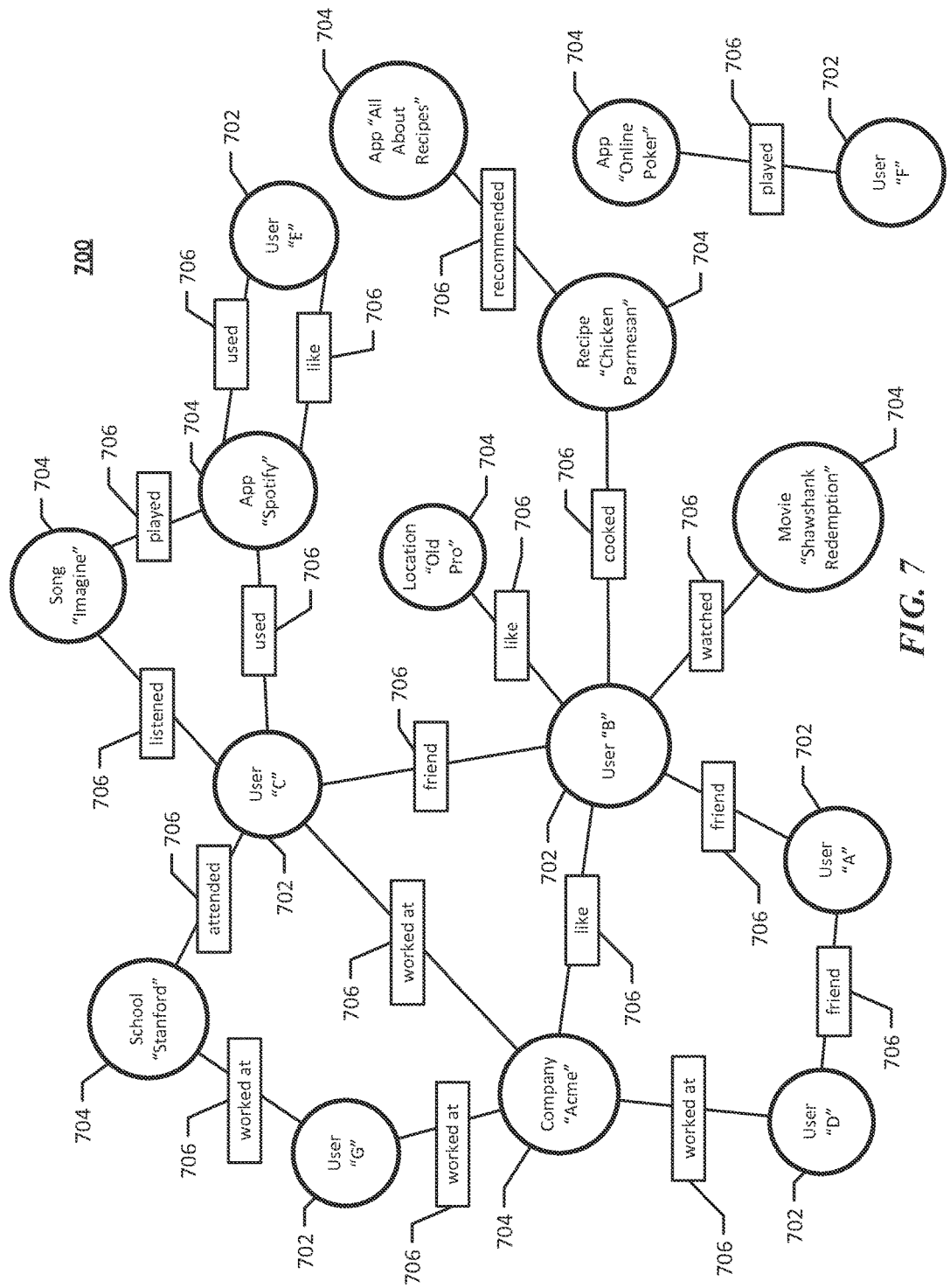
FIG. 7 illustrates an example social graph.

FIG. 7 illustrates example social graph 700. In particular embodiments, social-networking system 160 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 160, client system 130, or third-party system 170 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 160. In particular embodiments, a user node 702 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 706 connecting the first user's user node 702 to the second user's user node 702 in social graph 700 and store edge 706 as social-graph information in one or more of data stores 164. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 160 may create an edge 706 between a user node 702 and a concept node 704 in social graph 700. As an example and not by way of limitation, a user viewing a concept-profile page (such as, for example, by using a web browser or a special-purpose application hosted by the user's client system 130) may indicate that he or she likes the concept represented by the concept node 704 by clicking or selecting a "Like" icon, which may cause the user's client system 130 to send to social-networking system 160 a message indicating the user's liking of the concept associated with the concept-profile page. In response to the message, social-networking system 160 may create an edge 706 between user node 702 associated with the user and concept node 704, as illustrated by "like" edge 706 between the user and concept node 704.

In particular embodiments, social-networking system 160 may store an edge 706 in one or more data stores. In particular embodiments, an edge 706 may be automatically formed by social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
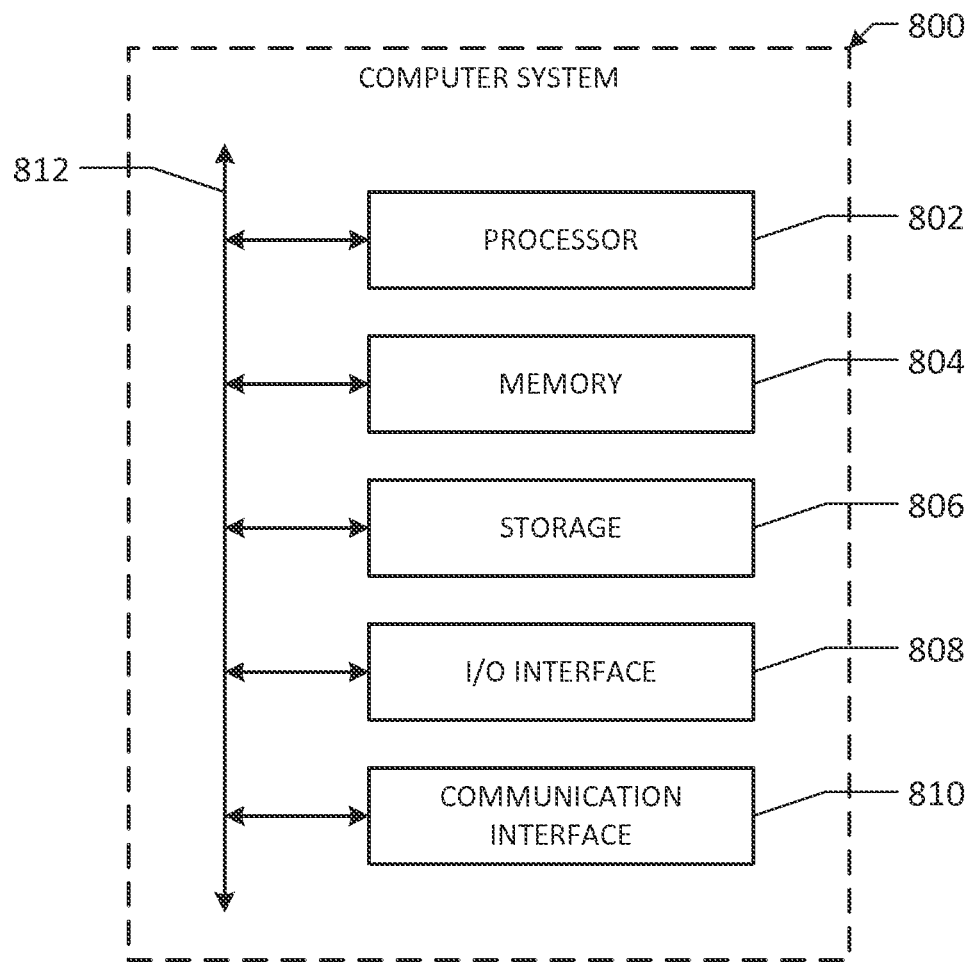
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device associated with a social-networking system, providing an application programming interface (API) to an application running on a client system, the API being provided based on a user of the client system being logged in to the social-networking system on the application;
   by the computing device, receiving, from the application, a first request, the first request comprising a new messaging token generated by a message-distribution server and stored by the application and a request to register the new messaging token to a user profile of the user on the social-networking system, wherein the new messaging token identifies the client system to the message-distribution server;
   by the computing device, sending, to the application, a verification token;
   by the computing device, receiving, from the application, a second request, wherein the second request comprises the verification token and context information of the application, wherein the second request was sent by the application using the API, and wherein the context information comprises an indication that the user was logged in to the social-networking system on the application at the time the second request was sent by the application; and
   by the computing device, updating, in response to the received first request and the received second request, a registration of the user profile by:
      discarding a previously-registered messaging token; and
      registering the new messaging token to the user profile.

2. The method of claim 1, wherein the first request comprises one or more cookies associated with the social-networking system, and wherein registering the new messaging token to the user profile further comprises identifying the user profile based on the cookies, the cookies indicating that the user associated with the user profile is logged in to the social-networking system on the application.

3. The method of claim 1, wherein the first request comprises a request to receive push notifications from the social-networking server at the application running on the client system.

4. The method of claim 1, wherein the application is a web browser.

5. The method of claim 1, wherein the verification token is a signed Uniform Resource Locator (URL).

6. The method of claim 1, wherein the first request is sent by the application, to the computing device, in response to a trigger event being detected by the application using the API.

7. The method of claim 6, wherein the trigger event comprises a change in at least one of the cookies associated with social-networking system.

8. The method of claim 6, wherein the trigger event comprises a version of the application being updated.

9. The method of claim 8, wherein the trigger event further comprises the user logging in to the social-networking system via the application running on the client system.

10. The method of claim 1 further comprising: sending a push notification to the client system via the message-distribution server, wherein the push notification and the new messaging token are sent to the message-distribution server.

11. The method of claim 10, wherein the push notification comprises instructions to cause the application to determine whether the application has permission to provide the push notification before displaying the push notification to the user of the client system.

12. The method of claim 11, wherein the determining whether the application has permission comprises determining whether the user is currently logged in to the social-networking system on the application.

13. One or more computer-readable non-transitory storage media associated with a social-networking system embodying software that is operable when executed to:
   provide an application programming interface (API) to an application running on a client system, the API being provided based on a user of the client system being logged in to the social-networking system on the application;
   receive, from the application, a first request, the first request comprising a new messaging token generated by a message-distribution server and stored by the application and a request to register the new messaging token to a user profile of the user on the social-networking system, wherein the new messaging token identifies the client system to the message-distribution server;
   send, to the application, a verification token;
   receive, from the application, a second request, wherein the second request comprises the verification token and context information of the application, wherein the second request was sent by the application using the API, and wherein the context information comprises an indication that the user was logged in to the social-networking system on the application at the time the second request was sent by the application; and
   update, in response to the received first request and the received second request, a registration of the user profile by:
      discarding a previously-registered messaging token; and
      registering the new messaging token to the user profile.

14. The media of claim 13, wherein the first request comprises one or more cookies associated with the social-networking system, and wherein registering the new messaging token to the user profile further comprises identifying the user profile based on the cookies, the cookies indicating that the user associated with the user profile is logged in to the social-networking system on the application.

15. The media of claim 13, wherein the first request comprises a request to receive push notifications from the social-networking server at the application running on the client system.

16. A system associated with a social-networking system comprising: one or more processors; and a memory coupled to the processors comprising instructions executable by the processors, the processors operable when executing the instructions to:

provide an application programming interface (API) to an application running on a client system, the API being provided based on a user of the client system being logged in to the social-networking system on the application;

receive, from the application, a first request, the first request comprising a new messaging token generated by a message-distribution server and stored by the application and a request to register the new messaging token to a user profile of the user on the social-networking system, wherein the new messaging token identifies the client system to the message-distribution server;

send, to the application, a verification token;

receive, from the application, a second request, wherein the second request comprises the verification token and context information of the application, wherein the second request was sent by the application using the API, and wherein the context information comprises an indication that the user was logged in to the social-networking system on the application at the time the second request was sent by the application; and update, in response to the received first request and the received second request, a registration of the user profile by:

discarding a previously-registered messaging token; and registering the new messaging token to the user profile.

17. The system of claim 16, wherein the first request comprises one or more cookies associated with the social-networking system, and wherein registering the new messaging token to the user profile further comprises identifying the user profile based on the cookies, the cookies indicating that the user associated with the user profile is logged in to the social-networking system on the application.

18. The system of claim 16, wherein the first request comprises a request to receive push notifications from the social-networking server at the application running on the client system.

* * * * *